United States Patent [19]

Zuranski et al.

[11] Patent Number: 4,639,934
[45] Date of Patent: Jan. 27, 1987

[54] LINE IMPAIRMENT DISPLAY FOR DIGITAL MODEMS

[75] Inventors: Edward S. Zuranski, Largo; Robert E. Scott, Clearwater; William L. Betts, St. Petersburgh, all of Fla.

[73] Assignee: Paradyne Corporation, Largo, Fla.

[21] Appl. No.: 722,295

[22] Filed: Apr. 11, 1985

[51] Int. Cl.$^4$ .............................................. H04B 3/46
[52] U.S. Cl. ........................................ 375/10; 375/39; 375/51
[58] Field of Search .................... 375/10, 39, 7, 8, 51; 178/69 G; 370/10; 371/3, 15; 340/384 R; 364/514, 517, 487; 328/162; 324/57 DE, 57 N, 77 R

[56] References Cited

U.S. PATENT DOCUMENTS

| | | | |
|---|---|---|---|
| 4,273,955 | 6/1981 | Armstrong | 178/69 G |
| 4,351,059 | 9/1982 | Gregoire et al. | 375/10 |
| 4,377,822 | 3/1983 | Noirel et al. | 375/10 |
| 4,381,546 | 4/1983 | Armstrong | 375/10 |
| 4,516,216 | 5/1985 | Armstrong | 375/39 |
| 4,532,640 | 7/1985 | Bremer et al. | 375/39 |
| 4,534,026 | 8/1985 | Martinez et al. | 375/39 |
| 4,534,036 | 8/1985 | Betts et al. | 375/10 |
| 4,541,100 | 9/1985 | Sutton et al. | 375/10 |

Primary Examiner—Robert L. Griffin
Assistant Examiner—Stephen Chin
Attorney, Agent, or Firm—Kane, Dalsimer, Kane, Sullivan & Kurucz

[57] ABSTRACT

A modem receiver used in a QAM or PSK data communication system is provided with various circuits generating error or monitoring signals indicative of the status of the system. These signals and the in-phase and quadrature components of the received signals are fed to an interface circuit which generates display signals suitable for driving a display unit such as an oscilloscope. These display signals define an image composed of the signal constellation of the received signals and various error or monitoring points.

6 Claims, 2 Drawing Figures

LINE IMPAIRMENT DISPLAY FOR DIGITAL MODEMS

BACKGROUND OF THE INVENTION

1. Field of Invention

This invention pertains to modems used in data communication, and more particularly to a QAM or PSK modem which is able to generate signals indicating the received signals and line or channel impairments as a composite image.

2. Description of the Prior Art

It has been previously known that the performance of QAM or PSK data transmission systems, and especially the data transmission channels may be evaluated qualitatively by converting the received signals into a corresponding signal constellation and displaying the signal constellation as a two-dimensional pattern. The pattern can exhibit certain characteristics or distortions which are unique to particular line impairments. Thus, for example, a continuous (oscillatory) angular displacement of all the constellation points is indicative of phase jitter; continuous (oscillatory) radial displacement of the points is indicative of harmonic distortion; a relatively constant angular displacement of the constellation points is indicative of frequency offset, and so on. A complete description of characteristic variations in a signal constellation is found in commonly assigned U.S. Pat. No. 4,503,545, granted on Mar. 5, 1985 and entitled "Systems for Evaluating Transmission Line Impairments". In addition, while visual inspection of the constellation is sufficient for QAM or PSK schemes using a relatively small number of points (i.e. 8–16 points) it has been found that for large signal constellations having 64 or more points, visual inspection becomes so difficult that it is virtually impossible to extract any useful information therefrom.

OBJECTIVES AND SUMMARY OF THE INVENTION

In view of the above, it is a principal objective of the subject application to provide a modem capable of providing a visual representation of a received signal constellation and various line impairments independently of the number of points in the constellation.

A further objective is to provide an actual indication of certain preselected line impairments directly without interpreting the distortions in the constellation.

Other objectives and advantages of the invention shall become apparent from the following description of the invention. A QAM or PSK modem, according to the present invention, comprises means for receiving data signals into corresponding in-phase and quadrature components, means for generating various error signals corresponding to said in-phase and quadrature components and display interface circuit means for combining said components and said signals to produce a composite display of a corresponding signal constellation and various error indicia. In addition, according to the present invention, a QAM or PSK modem comprises the means for generating error signals including phase error, radial and tangential error, and baud timing loop error calculating means.

DETAILED DESCRIPTION OF THE INVENTION

Figure 1:
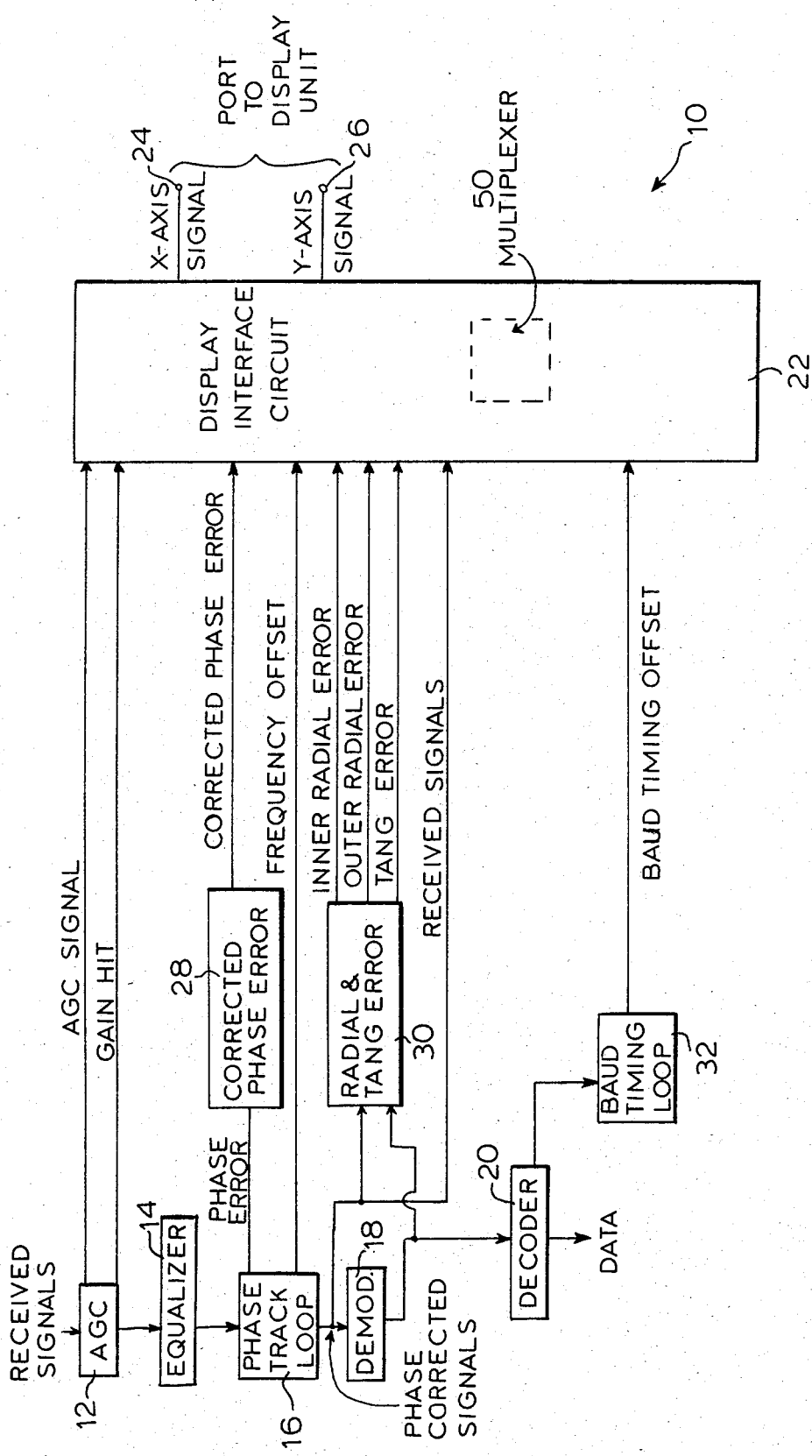
FIG. 1 discloses the receiver portion of a modem constructed in accordance with this invention.

Details of a modem receiver section shall now be described in conjunction with FIG. 1. Signals received via a communication channel (not shown) are first fed into an automatic gain control circuit (AGC) 12 which monitors the level of the received signal and, if necessary, multiplies them by a scaling signal (hereinafter called an AGC VALUE signal) to generate signals within a preselected range. The scaling signal is determined by monitoring the level of the incoming signals over a preselected time period (or a preselected number of bauds). Large instantaneous excursions in the signal levels are used to generate a GAIN HIT signal but are otherwise ignored. AGC circuits of this type are well known in the art and need not be described any further.

The gain controlled signals from AGC 12 are fed to an adaptive equalizer 14 for dynamic equalization. The signals equalized by equalizer 14 are fed into a phase-tracking loop 16 provided to rotate the signals by a phase error signal. A complete description of a phase tracking loop is found in U.S. Pat. No. 4,532,640 granted on July 30, 1985 based on U.S. application Ser. No. 407,451 filed on Dec. 8, 1982 and entitled "Phase Tracking Loops for Digital Modems". The phase tracking loop 16 is used to reduce errors due to low frequency jitter and frequency offset by generating and integrating a phase error signal. As a byproduct of the phase tracking loop, a signal is obtained in the phase tracking loop which is indicative of the frequency offset of the carrier signal.

The output of phase tracking loop 16 is fed to a demodulator 18. As is usual in QAM and PSK-type modems, the received signals are resolved into in-phase and quadrature components representative of the received signals as points of a signal constellation. In demodulator 18, these components are used to map each received signal on a complex plane for determining the closest ideal signal point corresponding to the received point (i.e. the point that would have been received in the absence of any noise or channel disturbances).

The components of the ideal point corresponding to each received signal are fed to a QAM or PSK decoder 20 which decodes these signals into appropriate output binary data signals. Thus the signals received at the AGC 12 produce output data signals from decoder 20.

In addition, according to this invention, various signals indicative of line impairments or other sources of error are generated within the modem and used for trouble shooting when a system malfunction is detected. To this end, the components of the received signals and the various error signals are fed to a display interface circuit 22. The display interface circuit uses the received signal components to generate the usual X- and Y- axis signals on its points 24 and 26 which, when used to drive a display device, generate a signal constellation. In addition, the display interface circuit superimposes on the signal constellation additional signals indicative of the various error signals.

For example, as shown in FIG. 1, the display interface circuit may be provided with the above mentioned AGC and GAIN HIT signals from AGC 12. The phase error signal may be fed to a corrected phase error generator circuit 28 which takes the phase error signal from the phase tracking loop 16, calculates its absolute value and passes it through a low pass filter to generate a corrected phase error signal to the display interface circuit. A more detailed description of the circuit 28 is found in U.S. Pat. No. 4,534,036 granted on Aug. 6, 1985, based on U.S. patent application Ser. No. 447,989 filed Dec. 8, 1982, and entitled "Tracking Loop Impairment Monitor".

The FREQUENCY OFFSET signal generated by the phase track loop 16 mentioned above is also fed to display interface 22 as shown.

A radial and tangential error calculating circuit 30 is provided to compare the radial and tangential errors in the components of various received signals as compared to the corresponding ideal points. While these calculations can be performed for all the received points, it is sufficient in most instances to calculate the radial error associated with a first point positioned relatively close to the origin of the constellation, and the radial and tangential errors associated with a second point positioned relatively farther away from the origin. These error signals are fed to the display interface circuit 22 as shown.

Finally the baud timing of the received signals may be monitored by using a baud timing loop 32. With the use of this loop, the local oscillator and more particularly, drifts in the oscillator crystal of the transmitting modem can be monitored to an accuracy of 100 parts per million. Baud timing drift results in a corresponding shift in the spectrum of the received signals. The timing loop generates a BAUD TIMING OFFSET signal also fed to DISPLAY INTERFACE CIRCUIT 22.

Figure 2:
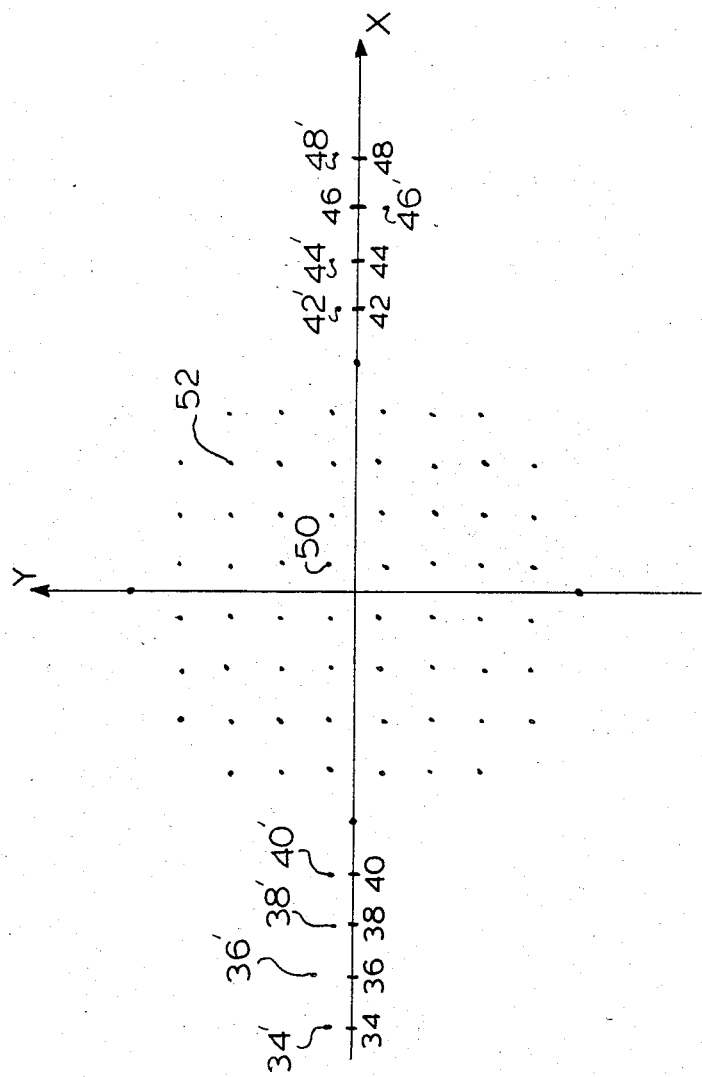
FIG. 2 illustrates a typical picture generated by a display unit connected to the modem of FIG. 1.

As previously mentioned the display interface circuit uses its input signals to generate X and Y signals at ports 24 and 26. When an appropriate display unit such as (a Tektronix Oscilloscope 465B) is coupled to these ports, an image is generated such as illustrated in FIG. 2. The image comprises a signal constellation (such as a 64-point constellation) generated around the origin defined by the intersection of the X and Y axes and corresponding to the particular QAM scheme used by the system. In addition, eight addition positions are allocated along the X-axis, four on each side of the constellation for various error signals. These positions are designated by numerals 34, 36, 38, 40, 42, 44, 46 and 48 in the Figure. A dot is then displayed at each position in accordance with the error or monitoring signals received by the display interface circuit. The distance of the dot above or below the X-axis is indicative of the amplitude of the corresponding error or monitoring signal. If no error signal is received, the corresponding dot lies on the X-axis.

For example, in FIG. 2, position 34 may correspond to radial error signal corresponding to a received inner point such as point 50. This error signal is shown as a dot 34' and is indicative of the actual noise on the channel.

Position 36 is assigned to the radial error of an outer point such as 52. The relative amplitude of the signal is shown by a dot 36' and is indicative of errors due to amplitude modulation, harmonic distortion, and noise. Position 38 (and dot 38') are related to the outer point tangential error which corresponds to relatively high (above 150 Hz) phase jitter. Position 40 and dot 40' are related to the corrected phase error signal which is indicative of low frequency (below 150 Hz) phase jitter.

On the right side of the constellation, position 42 and 42' is related to the frequency offset signal. Positions 44 and dot 44' are related to the baud timing offset while positions 46 and 48 are related respectively to the GAIN HIT and AGC VALUE respectively.

The constellation points are shown in FIG. 2 as ideal points (i.e. without distortions) for the sake of clarity. It should be understood that if components of the actual received points used to generate these points then constellation distortions will be present as described above. These distortions may still be analyzed visually in the normal manner.

Display interface circuit 22 may generate the signals corresponding to the X- and Y-axis of the composite image of FIG. 2 directly. Alternatively, circuit 22 may include a multiplexer for time-multiplexing the signals corresponding to the signal constellation with the error signals. The eyes of an observer and the latent image characteristic of the display unit will then superimpose the separate pictures to generate a composite picture of FIG. 2.

The various elements of the modem receiver 10 have been described as separate circuits performing particular functions. However, in microprocessor-based modems most of these functions, including the functions of elements 28, 30, 32, 22 can be performed by the microprocessor when said functions are incorporated in its software.

The set of error signals generated by the circuit of FIG. 1 are included for illustrative purposes only. Obviously other monitoring signals could be generated indicative of various characteristics of the data communication system, such as signal-to-noise ratios.

Obviously numerous modifications and configurations may be made and assembled by one skilled in the art without departing from the scope of the invention as defined in the appended claims.

We claim:

1. A modem receiver for generating binary data signals from quadrative amplitude modulated received signals comprising:
   means for converting said received signals into in-phase and quadrature components;
   means for generating error signals corresponding to said received signals; and
   display interface means for combining said in-phase and quadrature components and said error signals to generate display two orthogonal signals defining a composite image; said composite image comprising a signal constellation having points corresponding to said in-phase and quadrature components mapped into a complex plane and a plurality of monitoring points disposed at predetermined positions and corresponding to said error signals.

2. The modem of claim 1 wherein said means for converting said received signals comprise phase error correcting means for cancelling phase errors in said received signals, said components corresponding to phase-corrected received signals.

3. The modem receiver of claim 1 wherein said signal constellation is disposed around an origin defined by first and second orthogonal axis.

4. The modem receiver of claim 3 wherein said monitoring points are disposed at preselected positions along said first axis.

5. The modem receiver of claim 4 wherein said monitoring points are disposed at distances from said first axis indicative of the magnitudes of said error signals.

6. The modem of claim 2 wherein said means for generating error signals is coupled to said phase error correcting signals to generate phase error signals.

* * * * *